O. A. ROSS.
COMBINED AUTOMOBILE FENDER AND RADIATOR PROTECTOR.
APPLICATION FILED FEB. 15, 1919.
1,374,394. Patented Apr. 12, 1921.
2 SHEETS—SHEET 1.
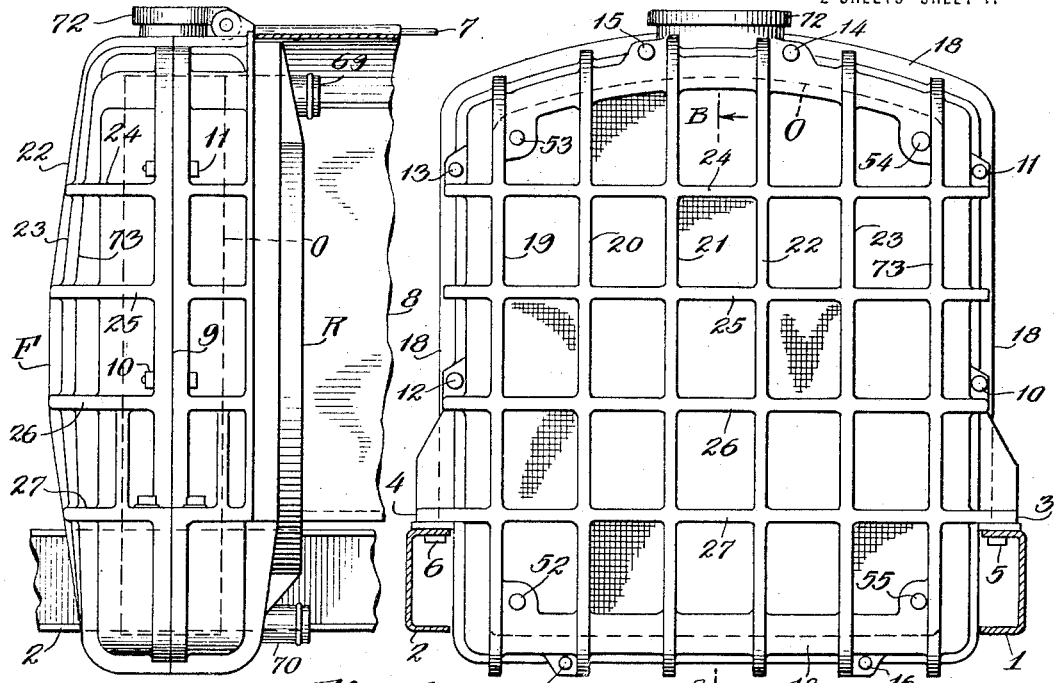
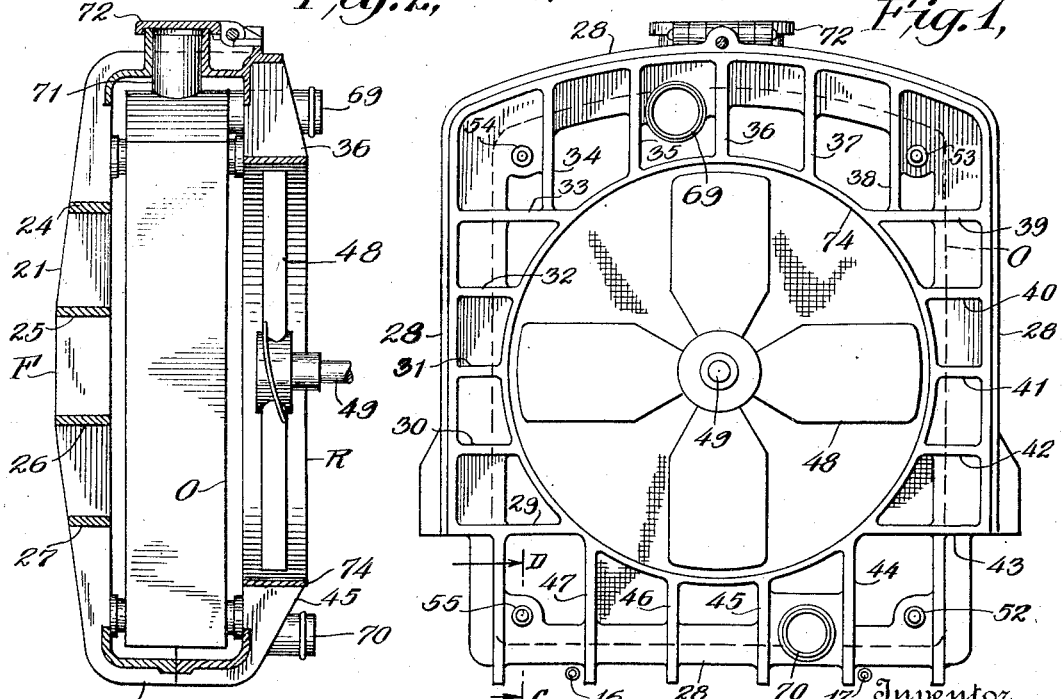
Inventor
Oscar A. Ross
By his Attorney
Lyman E. Dodge O. A. ROSS.
COMBINED AUTOMOBILE FENDER AND RADIATOR PROTECTOR.
APPLICATION FILED FEB. 15, 1919.
1,374,394.
Patented Apr. 12, 1921.
2 SHEETS—SHEET 2.
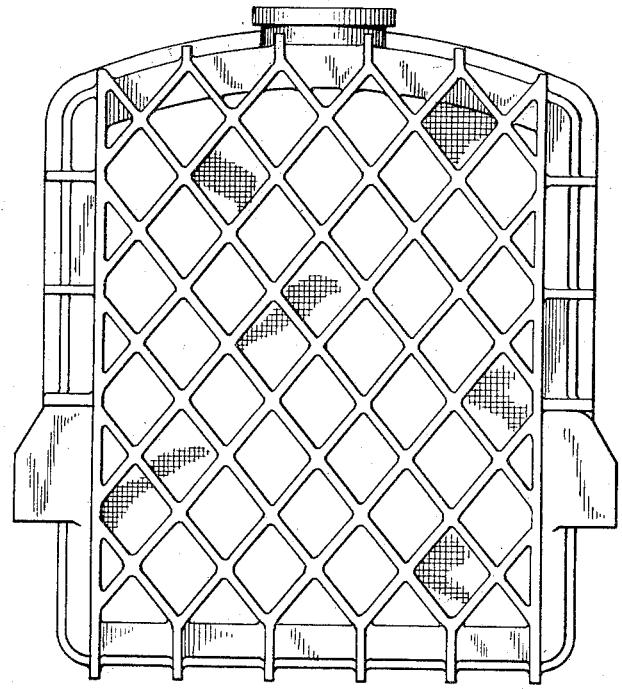
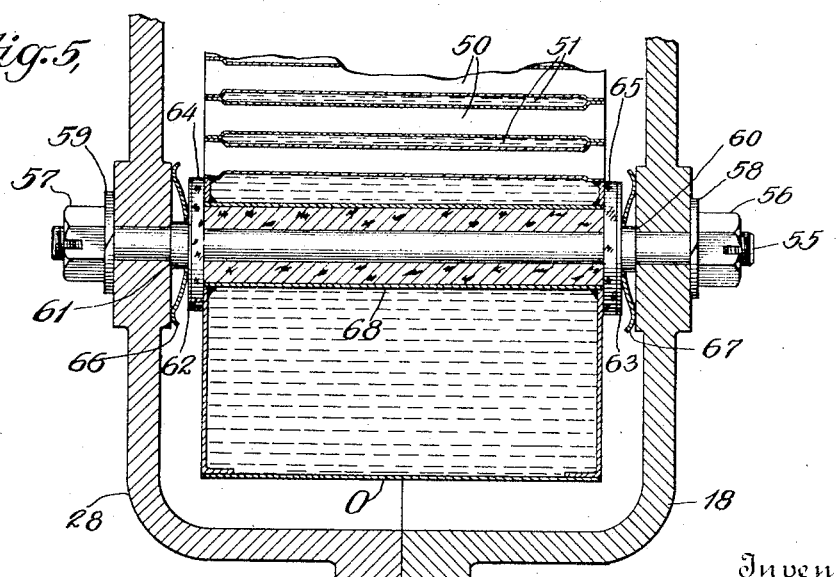
Inventor
Oscar A. Ross
By his Attorney
Lyman E. Dodge

UNITED STATES PATENT OFFICE.

OSCAR A. ROSS, OF NEW YORK, N. Y.

COMBINED AUTOMOBILE FENDER AND RADIATOR-PROTECTOR.

1,374,394.   Specification of Letters Patent.   Patented Apr. 12, 1921.

Application filed February 15, 1919. Serial No. 277,335.

*To all whom it may concern:*

Be it known that I, OSCAR A. ROSS, a citizen of the United States, and a resident of the borough of Manhattan, city of New York, in the county of New York and State of New York, have invented a new and useful Combined Automobile Fender and Radiator-Protector, of which the following is a specification.

This invention relates to automobiles and especially to that type of automobile propelled by an internal combustion engine of the type requiring a radiator for cooling the fluid circulating in the walls of the engine for keeping its temperature properly lowered and particularly to such a radiator and a protector therefor combined with a fender.

The principal object of the invention is the production of a construction for the parts mentioned which will be simple, economical, efficient and effective to protect the radiator and cushion it against shocks and provide also a firm rigid and strong structure to receive the occasional but frequent blows administered to the front end of an automobile.

Other objects and advantages will appear as the description of the invention progresses, and the novel features of the invention will be particularly pointed out in the appended claims.

The invention consists in the novel construction and arrangement of parts hereinafter described, delineated in the accompanying drawings, and particularly pointed out in that portion of this instrument wherein patentable novelty is claimed for certain distinctive and peculiar features of the device, it being understood that, within the scope of what hereinafter thus is claimed, divers changes in the form, proportions, size and minor details of the structure may be made, without departing from the spirit or sacrificing any of the details of the invention.

In describing the invention in detail, reference is had to the accompanying drawings, wherein I have illustrated a preferred physical embodiment of my invention, and wherein like characters of reference designate corresponding parts throughout the several views, and in which—

Figure 1 is a front elevational view of my combined automobile fender and radiator protector; Fig. 2, is a right hand side elevational view of the device as illustrated by Fig. 1; Fig. 3, is a rear elevational view of the device illustrated by Fig. 1; Fig. 4, is a sectional elevational view of the device of Fig. 1, on the line A—B, viewed in the direction of the arrows; Fig. 5, is a fragmentary detail sectional view on the line C—D of Fig. 3, viewed in the direction of the arrows; Fig. 6, is a front elevational view of a modification of the device illustrated by Fig. 1.

As shown in Fig. 1, the numerals 1 and 2 designate the channel shape side sills of the chassis of an automobile upon which my combined fender and radiator protector is mounted. The fender has, as best shown in Fig. 1, two outstanding flanges 3 and 4 which are located over the side sills 1 and 2 and are supported thereby. These flanges serve to support the fender, and the bolts 5 and 6, best shown in Fig. 1, serve to rigidly fasten the fender in proper position on the side sills.

The rod serving as a pivot for the parts of the ordinary two part automobile hood, is best shown in Fig. 2 and is designated 7. This rod is the pivot for the two parts of the hood, one part of which is shown and designated 8.

The fender proper forming one part of my invention is composed of two parts, a front portion, best shown in Fig. 2, designated generally by F and a rear portion, designated generally by R. These two portions meet on the median line 9 and are suitably rigidly secured together as by bolts, 10, 11, 12, 13, 14, 15, 16 and 17, two of which appear in Fig. 2 and the remainder in Fig. 1.

Each of the parts of the fender is composed of any suitable strong, tough material which is resistant to severe blows and shocks to such an extent that it will not be unduly distorted or broken by the ordinary blows which it is likely to receive in use considering its location on the front of an automobile, particularly the type known as a truck.

The front portion F of the fender consists of an approximate quadrangular frame 18, best shown in Fig. 1, and in Fig. 4, formed comparatively deep from front to rear, that is in the line of the application of the force of any probable blow. I desire to have it understood however that the general form of the frame is merely illustrative, and that I do not desire to be understood as in any wise excluding other appropriate forms which may well occur to those adapting my invention to various types of automobiles or trucks. The sides of the frame are connected by ribs both horizontal and vertical 19 to 27 inclusive and 73. The ribs are preferably formed integrally with the frame 18, as shown, and also preferably with each other as shown. The vertical ribs are of a comparatively small dimension from right to left, as viewed in Fig. 1, but comparatively deep from front to rear. The horizontal ribs are similarly formed. The ribs are also preferably integrally joined at the points where they intersect each other. This construction provides a reticulated frame which is very resistant to the force of blows applied to the face thereof, and may well be made of such size that it will be so resistant that no probable blow will appreciably distort it.

The rear portion of the fender is likewise composed of an approximate quadrangular frame 28, best shown in Fig. 3. In the space between the sides of the frame is located an annulus 74, shown in Figs. 3 and 4. This annulus is comparatively deep from front to rear and is joined to the sides of the quadrangular frame by ribs, deep from front to rear, these ribs being designated 29 to 47 inclusive. These ribs are preferably formed integrally both with the quadrangular frame, with the annulus and with each other at the points of intersection, as shown in Fig. 3. This construction like the construction of the front portion F provides a reticulated frame which is very resistant to the force of blows applied to the face thereof.

The annulus 74 in the rear portion R of the fender provides a space within which may be located the well known and easily recognized fan 48 mounted on the shaft 49. This fan, as is well understood, serves to draw air through the fender and also through the air spaces of the radiator which will be later described and which is mounted within the fender.

A radiator, best shown in Fig. 4, designated generally by O is positioned between the front and rear portions F and R of the fender. This radiator may be of any usual or preferred type, but I have illustrated, best shown in Fig. 5, a radiator of that type which is formed principally of preferably square tubing having very thin walls, which are expanded at either end, and joined at the ends in any approved manner as by soldering to similar tubing positioned on all four sides thereof, thus forming a water tight structure and spaces for water to circulate between the outer walls of the several tubes. In Fig. 5 the tubes are designated 50 and the spaces there between by 51.

The radiator O is supported between the two parts of the fender by four supporting bolts, 52 to 55 inclusive, best shown in Figs. 1 and 3. The details of this support are best shown in Fig. 5. A fragment of the front portion F of the fender is shown, designated 18, and a fragment of the rear portion R, designated 28. The bolt 55 is shown held in place by nuts 56 and 57 which are tightened against spring washers 58 and 59 which bear respectively against frame 18 and frame 28. The bolt 55 has shoulders 60 and 61 which act to prevent straining the frame when the nuts 56 and 57 are tightened.

Surrounding the bolt and slidable freely thereon, are the thin metallic washers 62 and 63 and the thin washers of resilient material, preferably cork, designated 64 and 65. Pressing against the metallic washers 62 and 63 respectively, are the four pronged bow springs 66 and 67, which have a bearing also on the frames 28 and 18, respectively, so that they act to force the thin metallic washer 62 and the cork washer 64 against the rear of the radiator, and the washer 63 and corkwasher 65 against the front of the radiator. This provides a construction which resiliently positions the radiator between the front and rear frames and absorbs shocks due to sudden starting or stopping of the automobile to which the fender is attached.

Passing through the radiator and suitably connected, as by soldering at its ends to the radiator, is a length of tubing 68. Between the walls of the tube and the rod 55 which passes through it is a resilient filling preferably cork, formed into a sheet and wrapped about the rod 55 and completely filling the space between rod 55 and the wall of the tube. This provides a construction which tends to absorb shocks to the radiator due to the sudden up and down motion of the automobile to which the fender is attached.

The inlet for the radiator, to which a length of flexible hose is usually attached is best shown in Fig. 3, and is designated 69, while the similarly formed and connected outlet is designated 70, as shown in Figs. 2, 3, and 4. A filling pipe is designated 71 and the hinged filling pipe cover 72.

Instead of forming the reticulated structure of ribs illustrated by Fig. 1, I may form it as shown by Fig. 6, where the ribs intersect at an angle other than a right angle, otherwise the construction of the combined fender and radiator protector may be the same, although I do not mean to exclude by this statement any different arrangement of the tubes of the radiator which it would be better to employ with the modification shown in Fig. 6, than the construction illustrated in Fig. 5.

It will be now understood that I have provided a structure which may be rigidly attached to the main side frames of an automobile, that the structure is strong and resistant to blows and that it serves to efficiently protect and resiliently support the necessary radiator so that collisions will fail to damage this extremely fragile structure.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim as new and desire to secure by Letters Patent of the United States, is:

1. In a combined automobile fender and radiator protector, in combination: an automobile frame; a reticulated hollow structure securely attached to said frame, and a radiator supported and entirely protected over its front and rear faces by said structure.

2. In a combined automobile fender and radiator protector, in combination: an automobile frame; a reticulated hollow structure securely attached to said frame, and a radiator resiliently supported and entirely protected over its front and rear faces by said structure.

3. In an automobile fender, in combination; an automobile frame; a frame forming a front portion and a frame forming a rear portion; means for securing the two portions firmly together; means joining the sides of the front portion for receiving blows; an annulus formed in the rear portion and joined to the frame of the rear portion by ribs and means securing both frames securely to the automobile frame.

4. In a combined automobile fender and radiator protector, in combination: an automobile frame; a body formed of a frame and having reticulated ribs joining the sides of the frame and forming an inclosed space; a radiator positioned in said inclosed space; means attached to said body for supporting said radiator and means rigidly securing the body to the automobile frame.

5. In a combined automobile fender and radiator protector, in combination: a structure including a frame and having reticulated ribs joining the sides of the frame and forming an inclosed space; a radiator positioned in said inclosed space; means attached to said structure and said radiator for resiliently supporting said radiator and means rigidly securing the said structure to the automobile frame.

6. In a combined automobile fender and radiator protector, in combination: an automobile frame; a reticulated frame forming an inclosed space; a radiator formed with a filling orifice, positioned in said space; means for supporting the radiator by the reticulated frame; said reticulated frame formed with an orifice corresponding to the orifice formed in the radiator and means for rigidly securing said reticulated frame to the automobile frame.

7. In a radiator support, in combination: two side frames; a radiator positioned therebetween; resilient material bearing against either side of the radiator; means for retaining the resilient material in position and means bearing on the side frames for resiliently pressing the resilient material against the sides of the radiator.

8. In a radiator support, in combination: two side frames; a radiator positioned therebetween having opposing side walls; a tube passing through both side walls and joined by a water tight joint thereto; a bolt passing through the tube and supported by the side frames and a layer of resilient material between the bolt and the tube.

9. In a radiator support, in combination: two side frames; a radiator positioned therebetween having opposing side walls; a tube passing through both side walls and joined by a water tight joint thereto; a bolt passing through the tube and supported by the side frames; and fastened to the side frames against longitudinal movement; a layer of resilient material between the bolt and the tube; washers of resilient material bearing against the sides of the radiator and supported by the bolt and resilient members interposed between the sidewalls of the radiator and the side frames.

10. In a combined automobile fender and radiator protector, in combination: an automobile frame; a reticulated hollow structure securely attached to said frame, and a radiator formed with air passages extending longitudinally of the automobile frame supported and entirely protected over its front face by said structure.

OSCAR A. ROSS.